(12) United States Patent
Wang (10) Patent No.: US 7,804,612 B2
(45) Date of Patent: Sep. 28, 2010

(54) NETWORK PRINTING WITH DRIVERLESS CLIENTS

(75) Inventor: Yao-Tian Wang, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 1155 days.

(21) Appl. No.: 11/345,503

(22) Filed: Jan. 31, 2006

(65) Prior Publication Data

US 2007/0177192 A1    Aug. 2, 2007

(51) Int. Cl.
*G06F 3/12* (2006.01)
*G06K 15/00* (2006.01)

(52) U.S. Cl. ............ 358/1.15; 358/1.13; 358/1.18

(58) Field of Classification Search .......... 358/1.15, 358/1.13, 1.18, 1.1, 1.9, 1.2, 1.11, 1.14, 1.16, 358/1.17, 400, 401, 407, 468; 347/2, 3, 5, 347/14, 23; 399/1, 8, 9; 709/220, 221, 230; 715/200, 274, 276; 710/8, 9, 10, 11, 14, 710/15, 17, 18, 19, 62, 64, 72, 314, 315
See application file for complete search history.

(56) References Cited

U.S. PATENT DOCUMENTS

| 5,467,434 | A * | 11/1995 | Hower et al. ............. 358/1.15 |
| 2002/0018234 | A1 | 2/2002 | Fu et al. |
| 2002/0171857 | A1 | 11/2002 | Hisatomi et al. |
| 2003/0058285 | A1 | 3/2003 | Jin |
| 2003/0184782 | A1 | 10/2003 | Perkins et al. |
| 2005/0046886 | A1 | 3/2005 | Ferlitsch |
| 2005/0132094 | A1 | 6/2005 | Wu |
| 2010/0100832 | A1 | 4/2010 | Wang |

FOREIGN PATENT DOCUMENTS

JP     2001/228998     8/2001
WO   WO 2004/070607 A1   8/2004

OTHER PUBLICATIONS

European Patent Office, "European Search Report", application No. EP 07250298, dated Feb. 23, 2010, 8 pages.

* cited by examiner

*Primary Examiner*—Dov Popovici
(74) *Attorney, Agent, or Firm*—Hickman Palermo Truong & Becker LLP; Edward A. Becker

(57) ABSTRACT

A method and mechanism for a client causing an electronic document to be printed without using a printer driver installed on the client is provided. A client discovers one or more printing devices on a network. The client communicates with a discovered printing device to identify the printing features supported by the discovered printing device. When the client receives a request to print an electronic document to a selected printing device, the client sends the electronic document and print configuration data to the selected printing device. As the client has been informed of the printing features supported by the selected printing device, the client can send the electronic document and the print configuration data to the selected printing device in a form readable by the selected printing device. The selected printing device processes the electronic document and the print configuration data to produce a printed copy of the electronic document.

45 Claims, 7 Drawing Sheets

NETWORK PRINTING WITH DRIVERLESS CLIENTS

FIELD OF THE INVENTION

The present invention relates to a client causing an electronic document to be printed without using a printer driver installed at the client.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Many applications allow a user to print data using a printer. In order to avoid making each application aware of the technical details of each printer model that the application supports, many clients that execute applications make use of a printer driver. A printer driver is a unit of software that is installed on a client. The printer driver is responsible for converting the data to be printed into a form readable by a particular printer model, thereby alleviating the application from the responsibility of converting the data to be printed into a form understandable by the printer. Installation of a printer driver typically involves registering the printer driver with the operating system of the client.

To illustrate how a printer driver works, when a user instructs an application to print an electronic document to a particular printer, the application may make a call to the operating system of the client. The operating system, in turn, may use the printer driver associated with the particular printer to convert the electronic document into a form readable by the particular printer. The converted electronic document contains configuration data that identifies, to the particular printer, how the user wishes to print the document. Thereafter, the client machine sends the converted electronic document to the printer. Because the converted electronic document is rendered in a form which the particular printer can process, the particular printer can print a copy of the converted electronic document in accordance with the configuration data contained therein.

There are several disadvantages associated with client-side printer drivers. To allow a client to print to a particular printer model, the manufacturer of the printer model must make a printer driver available that the client can use. Typically, this involves making a printer driver available for the operating system used by the client. However, given the resources involved in generating printer drivers, it may not be cost-effective for the manufacturer to make a printer driver available for each type of operating system. For example, some printer manufacturers do not make available printer drivers for clients executing the Linux operating system. As a result, clients executing the Linux operating system cannot print to those printers.

Even if a printer driver is available, the printer driver must still be installed on the client. Installing a printer driver requires a level of expertise that may be beyond that of a typical user. Additionally, installing a printer driver requires a certain amount of time and effort, which, when aggregated over a large number of installations, may also lead to significant cost and frustration.

Consequently, an approach for printing electronic documents from clients, without incurring the aforementioned disadvantageous, is desirable.

SUMMARY

Techniques are provided for a client causing an electronic document to be printed without using a printer driver installed on the client (a "client-side printer driver"). Embodiments of the invention operate under the observation that a client can detect the presence of a printing device on a network, and thereafter may communicate with the printing device to ascertain its printing capabilities, thereby obviating the need to install a client-side printer driver.

In an embodiment, a client discovers one or more printing devices on a network. The client may communicate with a discovered printing device to identify the printing features supported by the discovered printing device. When the client receives a request to print an electronic document to a selected printing device, the client sends the electronic document and print configuration data to the selected printing device. As the client has been informed of the printing features supported by the selected printing device, the client can send the electronic document and the print configuration data to the selected printing device in a form readable by the selected printing device. Advantageously, a client may print electronic documents to any type of printing device without the installation of a client-side printer driver.

BRIEF DESCRIPTION OF THE DRAWINGS

Embodiments of the present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the embodiments of the invention discussed herein. It will be apparent, however, that the embodiments of the invention discussed herein may be practiced without these specific details. In other instances, well-known structures and devices are shown in block diagram form in order to avoid unnecessarily obscuring the embodiments of the invention discussed herein.

Functional Overview

Embodiments of the invention advantageously provide for a client to print an electronic document without using a client-side printer driver. In an embodiment, a client discovers one or more printing devices on a network. For example, a client may identify one or more available printing devices on the network by receiving a message from each of the one or more available printing devices. Each available printing device may send such a message when the printing device becomes available for service or in response to receiving another message sent from the client.

The client may communicate with a discovered printing device to identify the printing features supported by the discovered printing device. For example, the client and the discovered printing device may exchange messages to inform the client of the printing features supported by the discovered printing device, such as what forms of electronic documents the discovered printing device can read and the different ways in which the discovered printing device can print electronic documents.

The client may present the user with an interface that allows the user to view all the discovered printing devices and the printing features which each supports. The user may use the interface to issue a request to print an electronic document to a selected printing device. The request may instruct that the electronic document be printed using the printing features supported by the selected printing device in a manner indicated by the user.

When the client receives the request to print the electronic document, the client sends the electronic document and print configuration data to the selected printing device. Print configuration data is data that instructs the selected printing device how the electronic document is to be printed using the printing features supported by the selected printing device. As the client has been informed of the printing features supported by the selected printing device, the client may need to convert the electronic document into a form which the selected printing device can read.

While the print configuration data is separate from the electronic document, both are expressed in a form the selected printing device can read. The electronic document and the print configuration data may each be described using generally known protocols. For example, the electronic document, when sent to the selected printing device, may be expressed using a generally known page description language (PDL) and the print configuration data, when sent to the selected printing device, may be expressed using a protocol that supports interoperable machine-to-machine interaction, such as the Web Services protocol, which is a public protocol made available and supported by the World Wide Web Consortium (W3C). The selected printing device may prepare the electronic document for printing by converting the electronic document from how it was expressed upon receipt to being expressed using a native format that a printing engine of the selected printing device can process. Advantageously, a client may print electronic documents to any type of printing device without the installation of a client-side printer driver.

Having presented a functional overview of an embodiment of the invention, additional description of the architecture of an embodiment will now be discussed.

Architectural Overview

Figure 1:
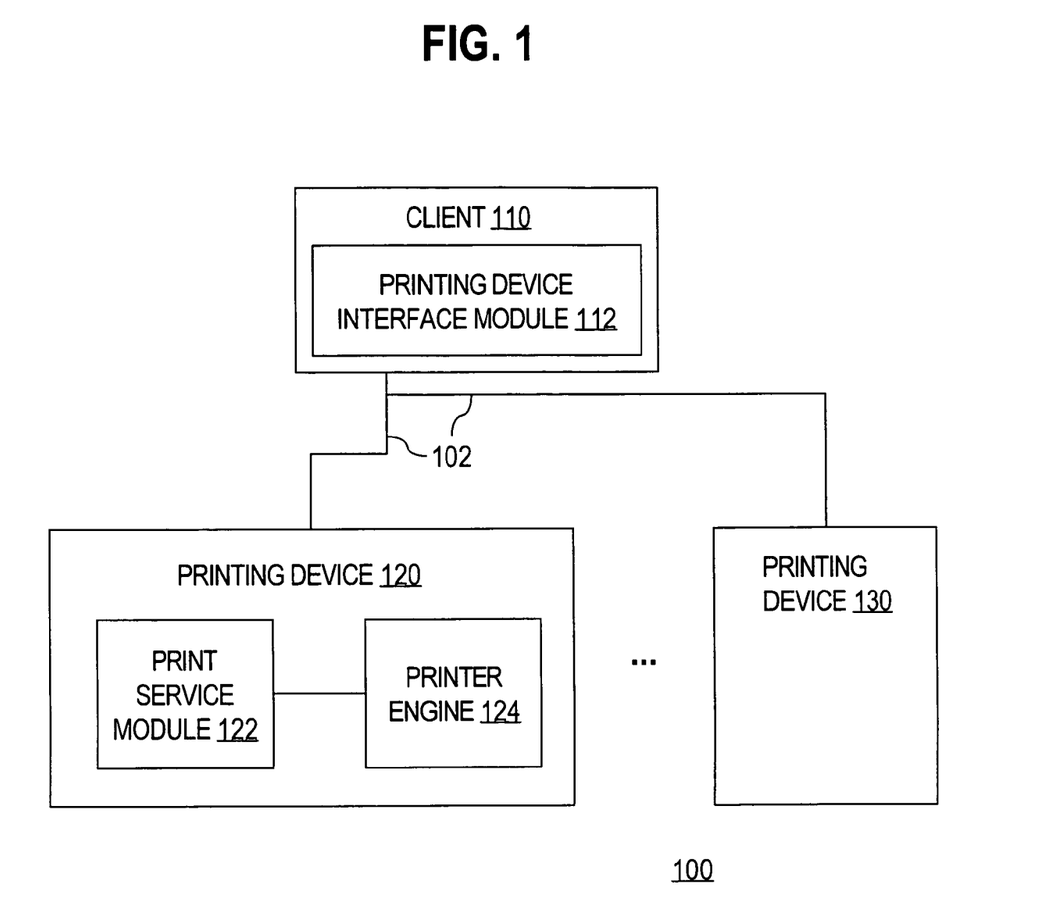
FIG. 1 is a block diagram of an illustrative system according to an embodiment of the invention.

FIG. 1 is a block diagram of an illustrative system 100 according to an embodiment of the invention. Only two printing devices and one client are depicted in system 100 for purposes of providing a clear example; however, embodiments of the invention may include any number of printing devices and any number of clients.

In an embodiment, system 100 includes a network 102, a client 110, and printing devices 120 and 130. Network 102 may be implemented by any medium or mechanism that provides for the exchange of data between clients and imaging devices in system 100. Examples of network 102 include, without limitation, a network such as a Local Area Network (LAN), Wide Area Network (WAN), Ethernet and the Internet. Network 102 may be implemented using one or more terrestrial, satellite, wired, or wireless links.

Client 110, as used herein, may be implemented by any medium or mechanism that provides for issuing a request to print any unit of data to a printing device. For example, a user may use client 110 to issue a request to print an electronic document to printing device 120. Examples of client 110 include, without limitation, a software application, a node on a network, a network appliance, a wireless device, a cell phone, a personal computer, and a portable digital assistance (PDA).

Client 110 includes printing device interface module 112. Printing device interface module 112 may be implemented by any medium or mechanism that provides for communicating with available printing devices on network 102. Client 110 may use printing device interface module 112 to discover an available printing device on network 102, to communicate with an available printing device to identify the printing features that the available printing device supports, and to transmit data to a particular printing device. The functions performed by printing device interface module 112 shall be described in greater detail below. While printing device interface module 112 is depicted in FIG. 1 as a single entity, in other embodiments of the invention, the functions performed by printing device interface module 112 may be performed by two or more entities.

While embodiments shall chiefly be described with respect to the printing of an electronic document without the need of a client-side printer driver, other embodiments of the invention allow for client 110 to issue a request to print other forms of data that may not necessarily be thought of as a "document." In order to provide a clear explanation, many embodiments shall be discussed herein with respect to printing an electronic document. However, it should be understood to those in the art that embodiments may be employed to print any type of data, and not necessary those types of data which may be considered to be a "document."

Printing devices 120 and 130 may be implemented by any medium or mechanism that provides for receiving an electronic form of data, such as an electronic document, from client 110, and thereafter printing the electronic form of data. Each printing device in system 100 may include a print service module 122 and a printer engine 124. Print service module 122 may be implemented by any medium or mechanism that provides for communicating with printing device interface module 112 and processing electronic documents and print configuration data. For example, print service module 122 may receive an electronic document and print configuration data from printing device interface module 112, and thereafter convert the received electronic document from being described using a PDL into being describing using a native format which printing engine 124 can process. The functions performed by print service module 122 are described in greater detail below. While print service module 122 is depicted in FIG. 1 as a single entity, in other embodiments of the invention, the functions performed by print service module 122 may be performed by two or more entities.

Printer engine 124 refers to the component of a printing device that is responsible for performing printing functions.

Thus, printer engine 124 can process an electronic document and print configuration data to cause one or more printed copies of the electronic documents to be produced by printing device 120 in according with the print configuration data.

In an embodiment (not depicted in FIG. 1), a client 110 may issue a request to print an electronic document to a print server, rather than directly to a printing device. A print server is responsible for receiving a request to print an electronic document. The print server may then dispatch the print request to one or more printing devices connected to the print server. In this way, the print server may select a particular printing device to service the print request based, at least in part, on load balancing considerations.

For example, if printing device interface module 112 sends a request to print an electronic document according to a set of print configuration data to the print server, the print server will determine which printing device(s) connected to the print server can service the request and would be appropriate to service the print request based upon a load balancing algorithm. Thereafter, the print server sends the electronic document and print configuration data to the selected printing device for processing. A print service module may be contained either at the print server or at each printing device connected to the print server.

Having described an illustrative architecture of an embodiment of the invention, an explanation of a client printing an electronic document according to an embodiment of the invention shall now be described.

Printing an Electronic Document

Figure 2:
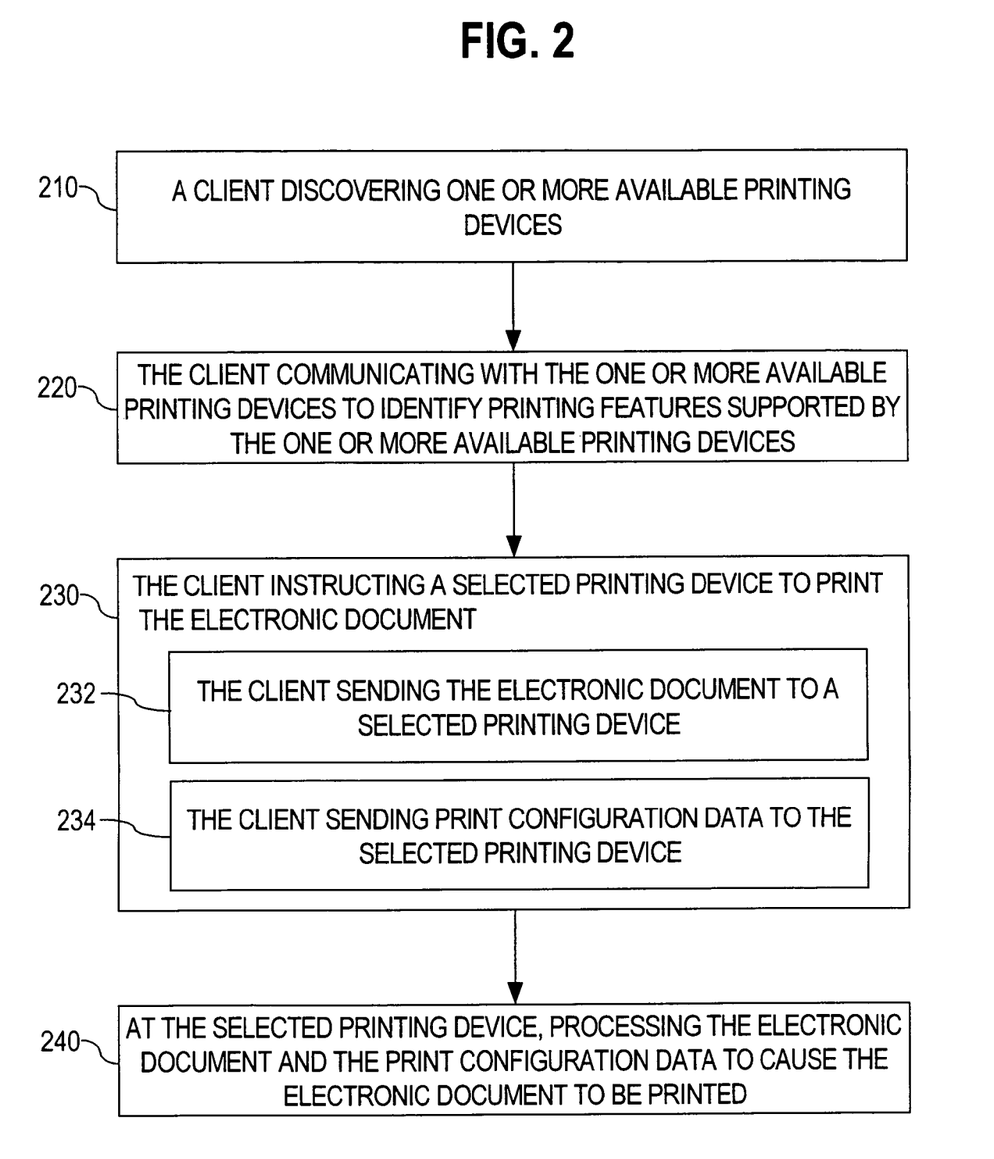
FIG. 2 is a flowchart illustrating the functional steps of printing an electronic document according to an embodiment of the invention.

FIG. 2 is a flowchart illustrating the functional steps of printing an electronic document according to an embodiment of the invention. The functional steps of FIG. 2 shall be explained below with reference to system 100 of FIG. 1. While the functional steps of FIG. 2 are graphically portrayed in FIG. 2 as following a linear progression, embodiments may perform the steps of FIG. 2 in a different order than graphically portrayed in FIG. 2, e.g., steps 210 and 220 of FIG. 2 may be performed simultaneously, steps 210 and 220 may each be performed multiple times, and steps 210 and 220 may each be performed in parallel to other steps of FIG. 2.

In step 210, client 110 discovers one or more available printing devices connected to network 140. To "discover" a printing device, as used herein, means to identify that the printing device is available for printing. In an embodiment, printing device interface module 112 may perform step 210. For example, printing device interface module 112 may discover that printing devices 120 and 130 are both available for printing.

In an embodiment, client 100 may identify that printing devices 120 and 130 are on network 102 and available for printing by sending a broadcast message over network 102. The broadcast message requests all available printing devices to identify themselves to client 110. In response to receiving the broadcast message, printing devices 120 and 130 each send a unicast message, to client 100, indicating their availability.

In an embodiment, client 110 may perform step 210 using the Web Services protocol. The Web Services protocol is designed to support interoperable machine-to-machine interaction. The Web Services protocol, in a mechanism called Web Services Discovery, provides native support for discovering a device, such as a printing device, that is configured to communicate using the Web Services protocol.

In other embodiments, client 110 may perform step 210 using another protocol, besides the Web Services protocol, that supports machine-to-machine interaction. As a result, embodiments of the invention need not employ the Web Services protocol in the performance of step 210, but may use other protocols available now or developed in the future that support machine-to-machine interaction.

In another embodiment, client 110 may discover an available printing device in step 210 by the printing device sending a broadcast message, indicating that the printing device is available to receive printing requests, over network 102 in response to the printing device joining network 102. For example, a printing device may send such a broadcast message after the printing device has been rebooted or turned on.

In an embodiment, the performance of step 210 may be delayed until client 110 receives a request, from a user, to print an electronic document. For example, if a user is using a text editor application, and the user selects the "print" button, then the performance of step 210 may be initiated. In this way, client 110 need not be made aware of the available printing devices on network 102 to which client 110 may print to until the user operating client 110 instructs client 110 to print an electronic document. After one or more available printing devices on network 102 have been discovered by client 110, processing proceeds to step 220.

In step 220, after discovering the one or more available printing devices on network 102, client 110 communicates with the one or more available printing devices connected to network 102 to identify printing features supported by the one or more available printing devices. To illustrate, if in step 210 client 110 discovered that printing devices 120 and 130 are available for printing, then in step 220 client 110 communicates with each of printing devices 120 and 130 to identify the printing features supported by each of printing devices 120 and 130. In an embodiment, printing device interface module 112 may perform step 210. For example, printing device interface module 112 may communicate with print service module 122 to identify the printing features supported by printing device 120 in step 220.

The printing features for a particular printing device, identified in step 220, may describe any way in which the particular printing device can print an electronic document. Illustrative examples of the types of printing features that may be identified in step 220 include, without limitation, document format support, color capabilities, font support, available finishing options, media options, and size and resolution availability.

In an embodiment, client 110 may perform step 220 using the Web Services protocol. The Web Services protocol provides native support for discovering the features supported by a device, such as a printing device, that is configured to communicate using the Web Services protocol. For example, the Web Services-MetadataExchange specification describes how to exchange metadata between devices, and the WSD-Print specification outlines a format of metadata to describe the printing features of a printing device. In other embodiments, client 110 may perform step 220 using another protocol, besides the Web Services protocol, which supports machine-to-machine interaction to determine the printing features supported by an available printing device. As a result, embodiments of the invention need not employ the Web Services protocol in the performance of step 220, but may use other protocols available now or developed in the future that support machine-to-machine interaction. After client 110 identifies the printing features of the one or more available printing devices discovered in step 210, processing proceeds to step 230.

In step 230, client 110 instructs a selected printing device to print the electronic document. Initially, printer device interface module 112 may present the user with an interface that allows the user to view all the discovered printing devices and the printing features which each supports. The user may then use the interface to select a particular available printing device to which the user wishes to print. The user uses the interface to issue a request to print an electronic document to the selected printing device. The request may instruct that the electronic document be printed using the printing features supported by the selected printing device in a manner indicated by the user. For purposes of providing a clear example, the below description shall assume that in step 230 a user used the interface to issue a request to print an electronic document to printing device 120.

As shown in FIG. 2, the performance of step 230 involves two substeps, namely steps 232 and 234. The performance of steps 232 and 234 are performance in response to the user issuing the request, using the interface, to print the electronic document to printing device 120. In step 232, client 110 sends the electronic document to printing device 120. In an embodiment, printing device interface module 112 sends the electronic document to print service module 122 of printing device 120 in step 232.

In an embodiment, printing device interface module 112 determines whether the printing features of printing device 120 supports a current version used to express the electronic document. For example, the current version of the electronic document may be a proprietary format, such as a Microsoft Word document. If printing device interface module 112 determines that the printing features of printing device 120 do not support the current version of the electronic document, then printing device interface module 112 converts the current version of the electronic document into an open standard version of the electronic document. The open standard version of the electronic document may describe the electronic document using a page description language (PDL), such as, e.g., Printer Control Language (PCL), Portable Document Format (PDF), Refined Printing Command Stream (RPCS), and Standard Page Description Language (SPDL). Thereafter, the printing device interface module 112 sends the open standard version of the electronic document to print service module 122.

However, if printing device interface module 112 determines that the printing features of printing device 120 does support the current version of the electronic document, then printing device interface module 112 sends the current version of the electronic document to print service module 122. For example, if the current version of the electronic document is a Microsoft Word document, then printing device interface module 112 sends the Microsoft Word document to print service module 122.

In an embodiment, instead of client 110 sending the electronic document in step 232, client 110 sends document identification data to printing device 120. Document identification data is data that identifies a location where the selected printing device may retrieve the electronic document. For example, document identification data may include or correspond to a URL that identifies a location on network 102, or another network, where the electronic document is located. Thus, when print service module 122 receives the document identification data, print service module 122 retrieves the electronic document from the location identified in the document identification data.

Step 234 is performed contemporaneous with the performance of step 232. In step 234, client 110 sends print configuration data to printing device 120. In an embodiment, step 234 may be performed by printing device interface module 112 sending the print configuration data to print service module 122. The print configuration data may be used to instruct printing device 120 how the electronic document is to be printed using the printing features supported by printing device 120.

The print configuration data is separate from the electronic document. For example, the electronic document, sent in step 232, does not contain the print configuration data. In an embodiment, the print configuration data may be sent to the print service module 122 in step 234 in the same data stream or unit of data as used to send the electronic document or document identification data in step 232. In another embodiment, the print configuration data may be sent to print service module 122 in a separate data stream as the electronic document or document identification data.

In an embodiment, the print configuration data may be expressed using the Web Services protocol. For example, the print configuration data, sent in step 234, may be expressed in a Web Services data structure called a "PrintTicket." As other data structures may be used to describe print configuration data, other protocols besides the Web Services protocol, may be used to describe print configuration data. After client 110 instructs the selected printing device, processing proceeds to step 240.

In step 240, the selected printing device (printing device 120 in this example) processes the electronic document and the print configuration data to cause the electronic document to be printed. In an embodiment, step 240 is performed by print service module 122 processing the electronic document and the print configuration data received in step 230. Thereafter, print service module communicates the processed electronic document and the print configuration data to printer engine 124. Thereafter, printer engine 124 causes a printed version of the processed electronic document to be printed in accordance with the print configuration data.

If the format of the electronic document that print service module 122 receives is a format that printer engine 124 cannot natively process, then print service module 122 converts the electronic document into a format which printer engine 124 can process. In an embodiment, prior to print service module communicating the processed electronic document and the print configuration data to printer engine 124, print service module 122 prepares the electronic document for printing by converting the electronic document from being described using a PDL to being described using a native format which a printing engine of the printing device can process. The electronic document described using the native format does not include the print configuration data. In an alternate embodiment, the electronic document described using the native format does include the print configuration data. In this way, print service module 122 may convert the electronic document into any native format which printer engine 124 can process.

The electronic document and the print configuration data are each separate from one another when received by print service module 122. As a result, print service module 122 may process the electronic document and the print configuration data separately using public protocols or proprietary protocols which print service module 122 is configured to read. Thus, the format of the electronic document and the print configuration data sent to print service module 122 by printing device interface module 112 is always readable by print service module 122.

Numerous embodiments have been discussed which facilitate a client to print electronic documents to any type of printing device without the installation of a client-side printer driver. For example, a user employing one embodiment of the invention may walk into an area supported by a wireless network, use a wireless device to join the wireless network, and thereafter print an electronic document to a printing device located on the wireless network, without installing a client-side printer driver for the printing device. Consequently, the cost, effort, time, and frustration associated with installing a client-side printer driver may be avoided by using embodiments of the invention.

Illustrative Embodiments

Figure 4:
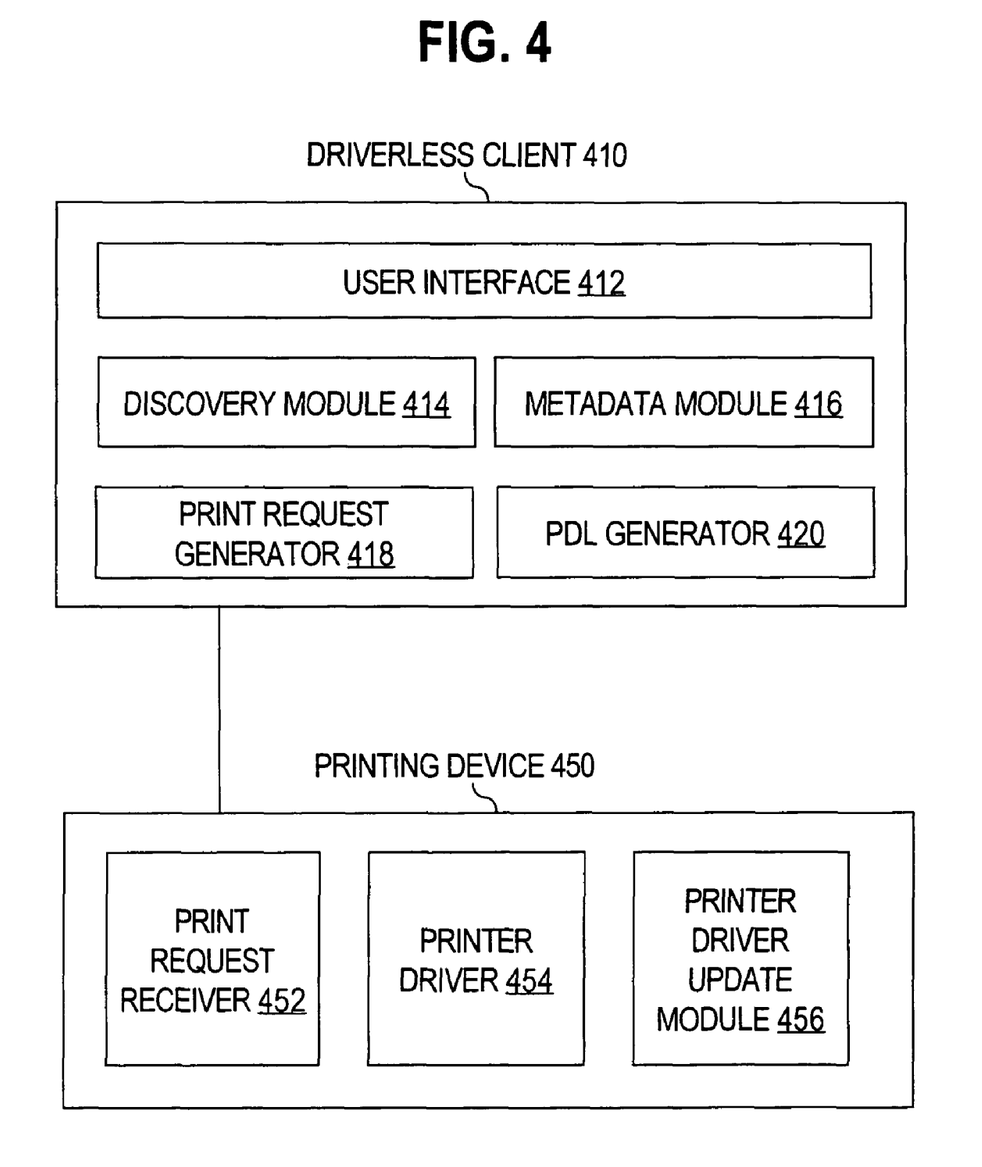
FIG. 4 is a block diagram of an illustrative client and printing device according to an embodiment of the invention.

FIG. 4 is a block diagram of an illustrative client 410 and an illustrative printing device 450 according to an embodiment of the invention. The illustrative client 410 and printing device 450 of FIG. 4 are one example of a variety of ways of implementing a client and a printing device. As such, FIG. 4 is not meant to depict each and every way in which a client and a printing device may be implemented, as other approaches for doing so are employed by other embodiments of the invention as described above.

As shown in FIG. 4, client 410 is driverless, which means that client 410 does not contain a printer driver. In the embodiment of FIG. 4, client 410 contains a user interface 412, discovery module 414, metadata module 416, print request generator 418, and PDL generator 420. User interface 412 refers to an interface, such as a graphical user interface or a command line interface, through which a user may issue instructions or commands to client 410. For example, user interface 412 may allow a user to issue a request to print an electronic document to client 410.

Discovery module 414 refers to any mechanism, resident on client 410, capable of discovering printing devices, on network 102, that are available for printing. For example, discovery module 414 may perform discovery using the Web Services protocol as described above in step 210 of FIG. 2.

Metadata module 416 refers to any mechanism, resident on client 410, capable of communicating with a discovered printing device to identify printing features supported by the discovered printing device. For example, metadata module 416 may perform step 220 of FIG. 2 using Web Services-MetadataExchange specification as described above.

Print request generator 418 refers to any mechanism, resident on client 410, capable of sending an electronic document and print configuration data to a selected printing device. For example, print request generator 418 may perform step 230 of FIG. 2.

PDL generator 420 refers to any mechanism, resident on client 410, capable of generating a version of an electronic document expressed using a PDL. For example, as explained above with reference to step 230, the electronic document sent from a client to a selected printing device may be expressed using a PDL. Thus, standard PDL generator 420 may generate a version of an electronic document expressed using a PDL prior to when print request generator 418 sends the electronic document to a selected printing device.

Printing device 450 of FIG. 4 contains a print request receiver 452, a printer driver 454, and a printer driver update module 456. Print request receiver 452 refers to any mechanism, resident on printing device 450, capable of receiving a print request. In an embodiment, a print request may correspond to (a) an electronic document or document identification data from client 410, and (b) print configuration data from client 410. As explained in further detail below, in an embodiment, client 410 may also transmit a printer driver selection to print request receiver 452 so that the user may select which printer driver printing device 450 uses to process the electronic document associated with the print request.

Printer driver 454 refers to a printer driver capable of being used to rasterize data for processing by a printer engine. Printing device 450 may contain any number of printer drivers.

Printer driver update module 456 refers to any mechanism, resident on printing device 450, capable of managing the printer drivers resident on printing device 450. For example, an administrator may use printer driver update module 456 to add, delete, or modify a printer driver resident on printing device 450.

Figure 5:
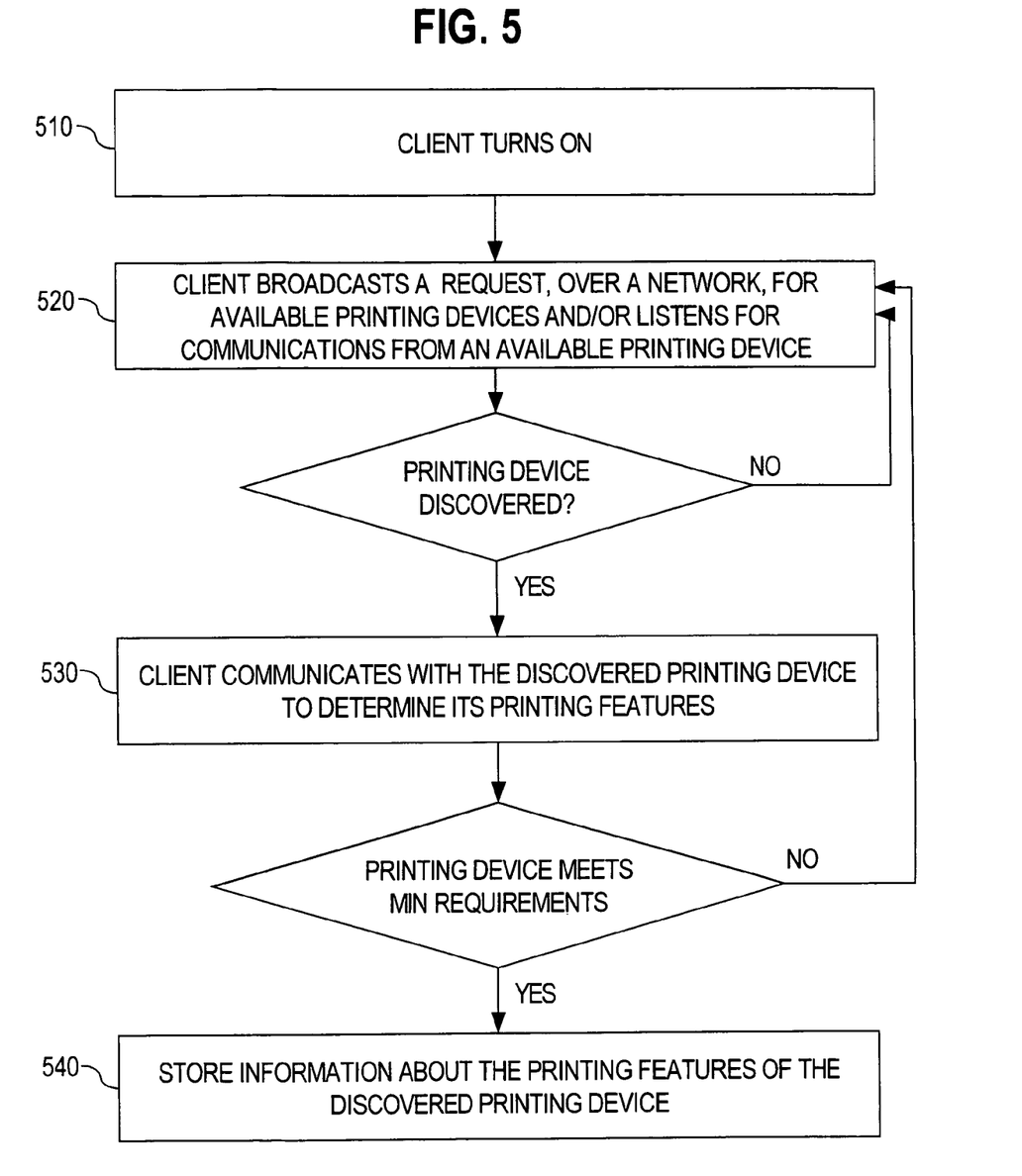
FIG. 5 is a flowchart illustrating the functional steps of a client discovering a printing device and retrieving the printing features of the printing device according to an embodiment of the invention.

FIG. 5 is a flowchart illustrating the functional steps of a client discovering a printing device and retrieving the printing features of the printing device according to an embodiment of the invention. FIG. 5 illustrates one example of how printing features of a printing device may be retrieved by a client. As such, the flowchart of FIG. 5 is not meant to depict each and every way in which a client may retrieve the printing features of a printing device, as other approaches for doing so are employed by other embodiments of the invention as described above.

Initially, in step 510, a client is turned or powered on. In step 520, the client broadcasts a request, over a network, for available printing devices to identify themselves to the client. Step 520 may be performed by discovery module 414. Simultaneously, in step 520, the client listens for all communications received from available printing devices. For example, in step 520, the client may discover a printing device using the Web Services protocol as explained above.

If a printing device is discovered, then in step 530 the client communicates with the discovered printing device to determine its printing features. For example, the client may perform step 530 by performing metadata exchange using the Web Services-MetadataExchange specification of the Web Services protocol as described above. Step 530 may be performed by metadata module 416.

In an embodiment, the client may establish certain minimum requirements that printing devices must meet. For example, a user may configure a client such that only printing devices that support certain features meet the minimum requirements. If, after performing step 530, a printing device is discovered that meets any minimum requirements established by the client, then step 540 is performed. In step 540, information about the printing features of the discovered printing device is stored at the client. In this way, the client can subsequently retrieve the information about the printing features of the discovered printing device for use in issuing a request to print an electronic document to the discovered printing device.

Figure 6:
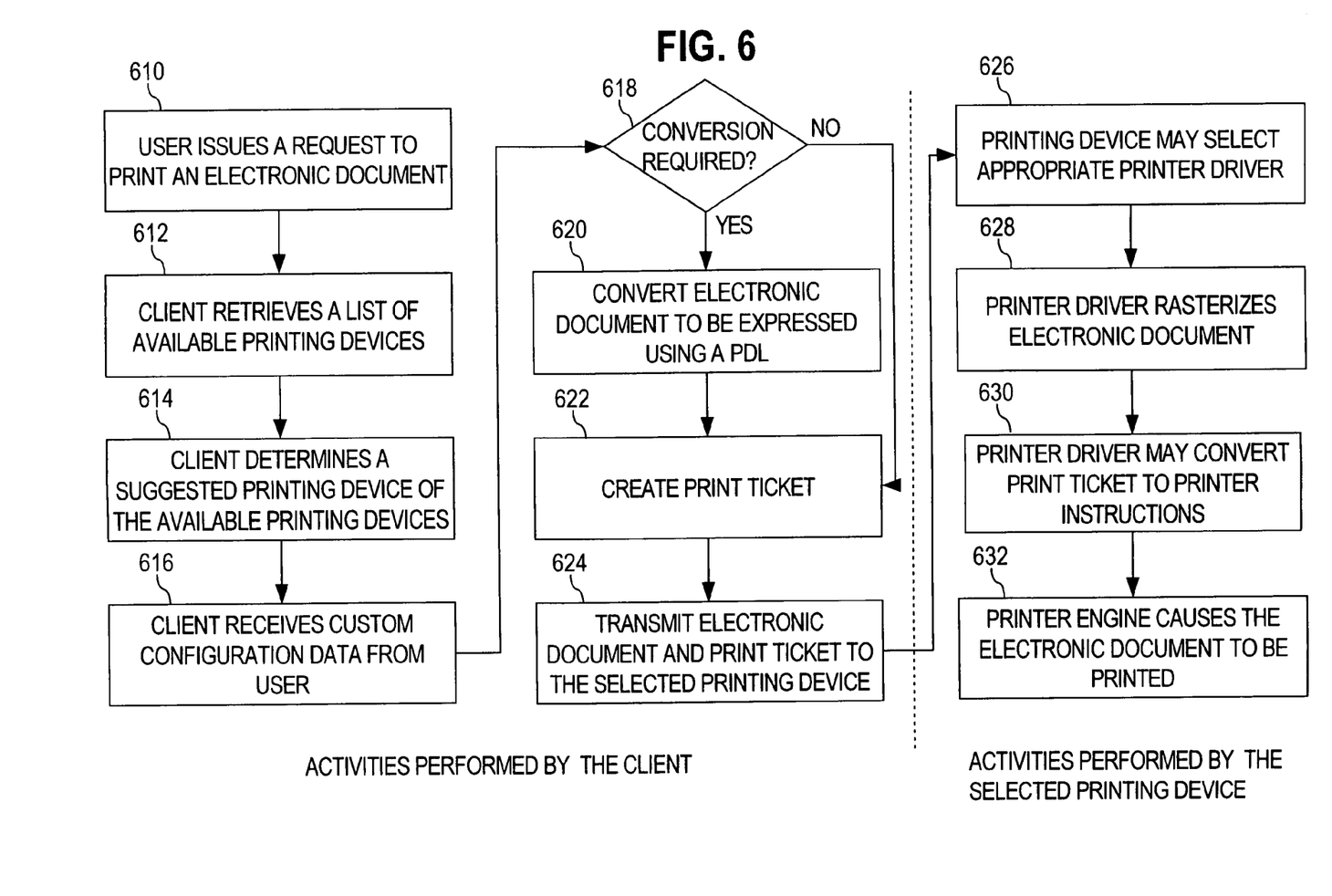
FIG. 6 is a flowchart illustrating the functional steps of a client causing an electronic document to be printed at a printing device according to an embodiment of the invention.

FIG. 6 is a flowchart illustrating the functional steps of a client causing an electronic document to be printed at a printing device according to an embodiment of the invention. The flowchart of FIG. 6 illustrates one example of a variety of ways in which a client may cause an electronic document to be printed at a printing device. As such, FIG. 6 is not meant to depict each and every way in which a client may cause an electronic document to be printed at a printing device, as other approaches for doing so are employed by other embodiments of the invention as described above.

In step 610, a user issues a request to print an electronic document. For example, the user may use user interface 412 to issue the request. In step 612, the client retrieves a list of available printing devices. The composition of the list of available printing devices may be determined as explained above with reference to FIG. 5. The list of available printing devices may be presented to the user using user interface 412. In step 614, the user selects a particular printing device, from the available printing devices, at which the electronic document should be printed. For example, the user may select the particular printing device using user interface 412. The client may receive data identifying the particular printing device selected by the user ("the selected printing device") through user interface 412. In step 616, the client receives custom configuration data from the user. The user may submit the custom configuration data to the client through user interface 412.

In an embodiment, step 616 may be performed prior to the performance of step 614 or step 612. In such an embodiment, the client may receive custom configuration data from the user through user interface 412 anytime after step 610 but before step 622. In such an embodiment, if the client has not received, from the user, an indication of the available printing device to which the user wishes to print, the client may remove printing devices, from the list of available printing device that may be used to print the electronic document, which cannot support the custom configuration data specified by the user. For example, certain printing devices, in the list of available printing devices, may not support printing the electronic document in accordance with the received custom configuration data. Thus, since the client maintains information about which printing features each printing device on the list of available printing devices supports, the client may adjust the list of available printing device (for example, by removing a printing device that does not support the custom configuration data) that may be used to print the electronic document to ensure each available printing device can print the electronic document according to the received custom configuration data.

To illustrate an example of such an embodiment, assume that the user specifies custom configuration data (in step 616) through user interface 412 prior to step 614. The client may initially display a list of ten available printing devices to the user through user interface 412 which may be used to print an electronic document. As the user submits custom configuration data to the client, the client may determine that only six of the ten available printing devices can support the printing features specified in the custom configuration data. Therefore, the client may adjust the list of available printing devices so that it includes only the six available printing devices that can support the printing features specified in the custom configuration data. The client may communicate the adjusted list of six available printing devices to the user through user interface 412. The user may then select (in step 614) a particular printing device, from the six available printing devices, at which the user wishes to print the electronic document.

In an embodiment (not depicted in FIG. 6), the client may receive custom configuration data from the user after the performance of steps 618 and 620 discussed below. Thus, step 616 may also be performed after the performance of certain steps depicted in FIG. 6, such as step 618 and 620. In other words, in an embodiment, the client may receive custom configuration data from the user anytime before the creation of the PrintTicket (discussed below in step 622). Thus, the electronic document may be converted to be expressing using a PDL (in step 620 discussed in more detail below) prior to the performance of step 616.

In 618, a determination is made as to whether the electronic document to be printed is expressed in a format that is understandable by the selected printing device. If the determination of step 618 is affirmative, then in step 620 the electronic document is converted such that it is expressed using a PDL, and processing proceeds to step 622 as shown. If the determination of step 618 is negative, then in step 622, a PrintTicket is created. As explained above, a PrintTicket is a Web Services data structure for expressing print configuration data.

In step 624, the client transmits the electronic document and the PrintTicket to the selected printing device. Note that steps 610 through 624 were performed at the client. The remainder of the steps depicted in FIG. 6 are performed by the selected printing device.

The selected printing device may contain any number of printer drivers. Thus, in step 626, after the selected printing device receives the electronic document and the PrintTicket, the selected printing device may select an appropriate printer driver to process the electronic document and the PrintTicket. Note that step 626 is optional, as the selected printing device may only have a single printer driver resident thereon. In step 628, the printer driver rasterizes the electronic document.

In step 630, the printer driver may convert the PrintTicket into printer instructions. The performance of step 630 is optional. For example, the printer engine may be able to natively process the PrintTicket, thereby eliminating the need to convert the PrintTicket into printer instructions. In step 632, the printer engine causes the electronic document to be printed by the selected printing device according to the print configuration data specified in the PrintTicket.

Figure 7:
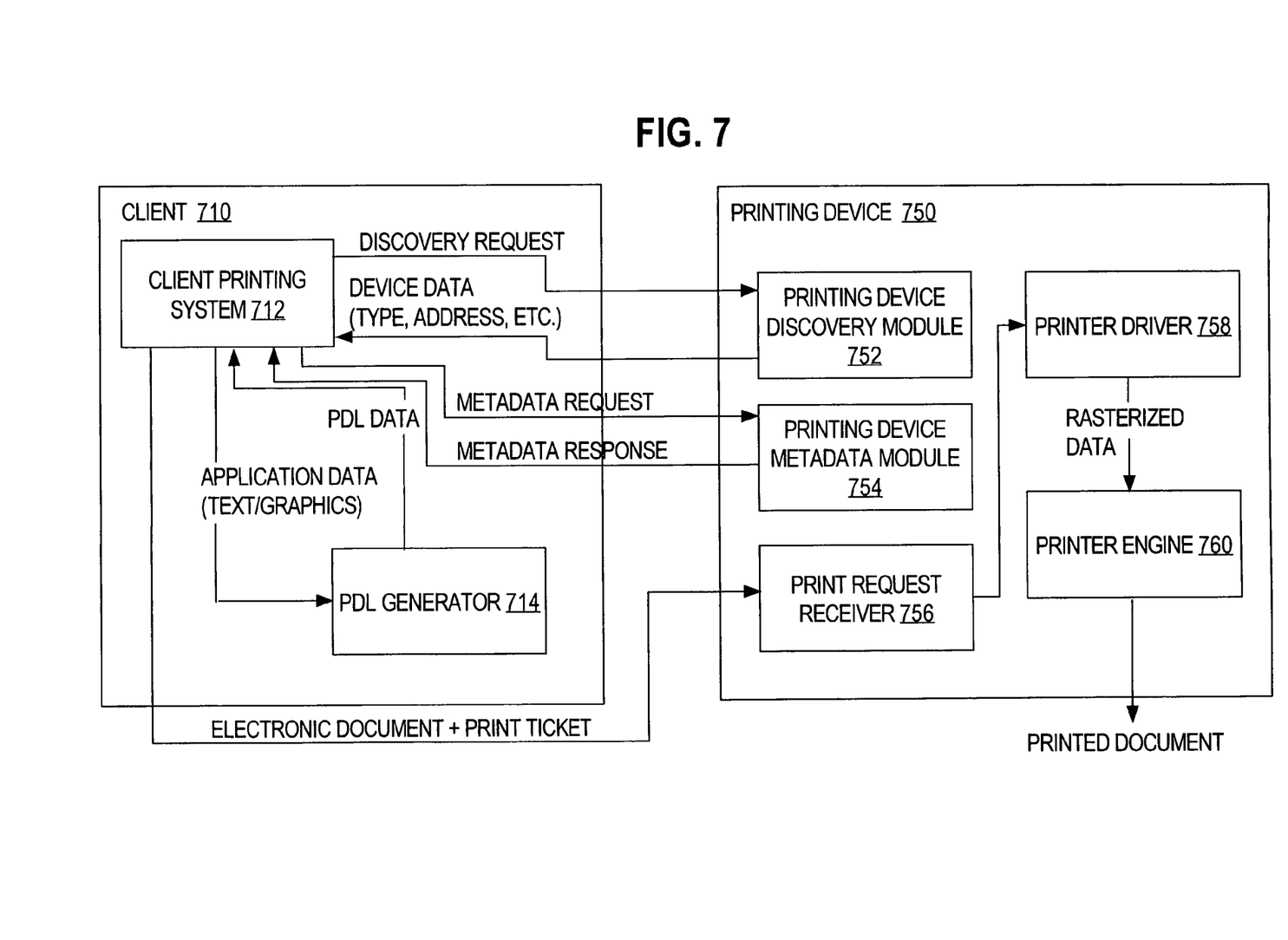
FIG. 7 is a block diagram illustrating an exemplary dataflow according to an embodiment of the invention.

FIG. 7 is a block diagram illustrating an exemplary dataflow according to an embodiment of the invention. The exemplary dataflow of FIG. 7 is one example of a variety of ways of in which client 710 and printing device 750 may interact with each other. As such, FIG. 7 is not meant to depict each and every way in which a client and a printing device may interact with each other, as other approaches for doing so are employed by other embodiments of the invention described above. For example, several functional components shown in FIG. 7 may be combined into a single component in other embodiments not depicted in FIG. 7. Client printing system 712 represents discovery module 414, metadata module 416, and print request generator 418 depicted in FIG. 4.

Client printing system 712 of client 710 may issue a discovery request to printing device 750. The discovery request is received at printing device 750 at printing device discovery module 752, which responds with device data that identifies printing device 750. The device data may contain information about printing device 750, such as the type of printing device or a network address.

Client printing system 712 will issue a metadata request to printing device 750. The metadata request is received at printing device 750 at printing device metadata module 754. Printing device metadata module 754 will respond with a metadata response that identifies the printing features that printing device 750 supports.

If necessary, client printing system 712 may convert an electronic document to be expressed using a PDL. To do so, client printing system 712 may instruct PDL generator 714 to convert the electronic document to be expressed using a PDL. PDL generator 714 may convert any type of text and/or graphics to be expressed using a PDL.

Client printing system 712 sends the electronic document and a PrintTicket to printing device 750. Print request receiver 756 receives the electronic document and the PrintTicket send from client printing system 712. Print request receiver 756 sends the electronic document and the PrintTicket to printer driver 758. Printer driver 758 may rasterize the electronic document and the PrintTicket, and provide the rasterized electronic document and PrintTicket to the printer engine 760. Printer engine 760 may then cause the electronic document to be printed in accordance with the custom configuration data contained within the PrintTicket.

Implementing Mechanisms

Figure 3:
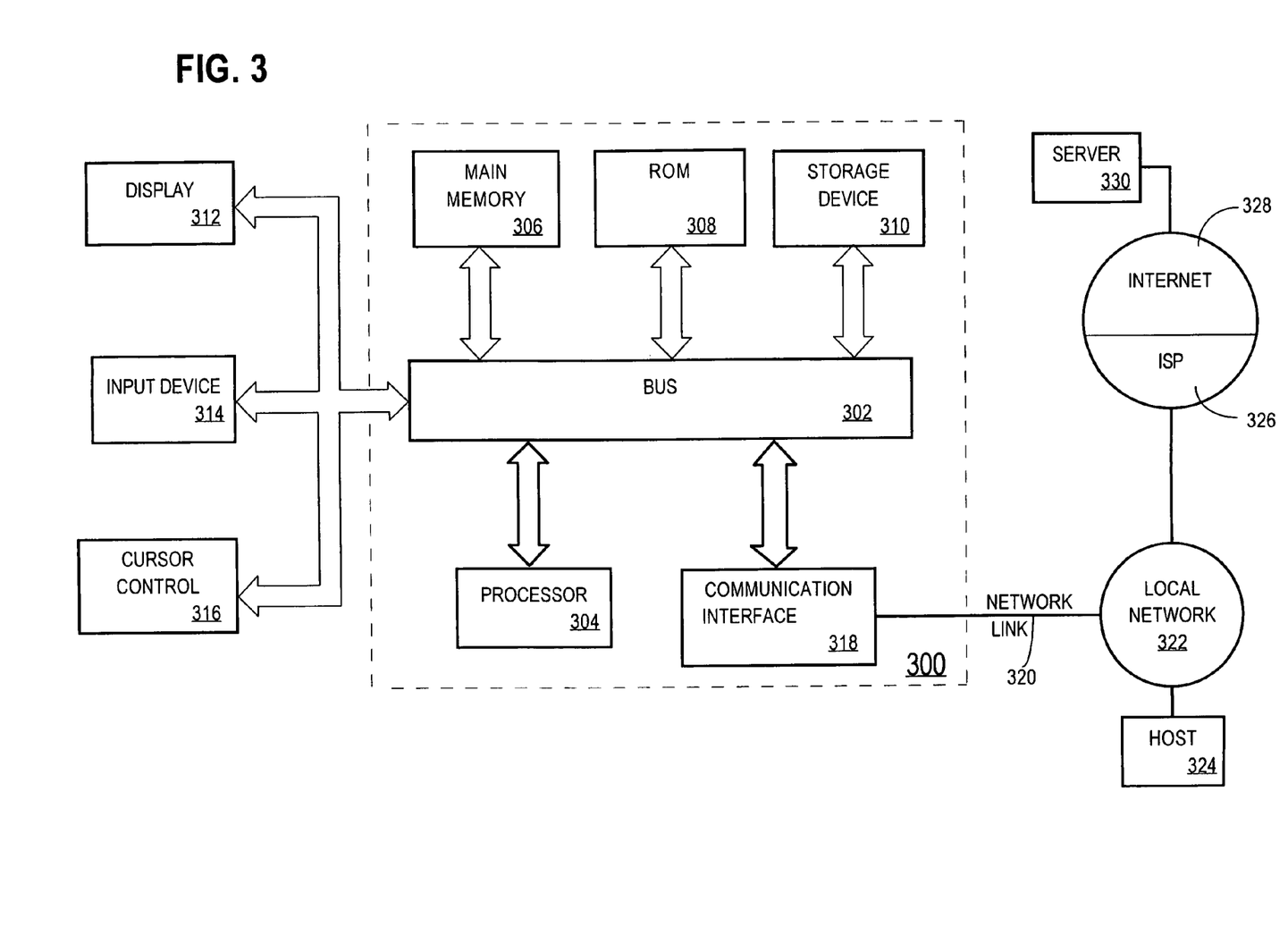
FIG. 3 is a block diagram that illustrates a computer system upon which an embodiment of the invention may be implemented.

In an embodiment, each client and printing device in system 100 may be implemented on a computer system. FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and request selections to processor 304. Another type of user input device is cursor control 316, such as a mouse, a trackball, or cursor direction keys for communicating direction information and request selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media and volatile media. Non-volatile media includes, for example, optical or magnetic disks, such as storage device 310. Volatile media includes dynamic memory, such as main memory 306. All such media must be tangible to enable the instructions carried by the media to be detected by a physical mechanism that reads the instructions into a machine.

Common forms of machine-readable media include, for example, a floppy disk, a flexible disk, hard disk, magnetic tape, a CD-ROM, any other optical medium, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for printing an electronic document, comprising:
    a client identifying one or more available printing devices by receiving a message, over a network, from each of the one or more available printing devices;
    the client communicating with the one or more available printing devices to identify printing features supported by the one or more available printing devices;
    in response to the client receiving a request to print an electronic document to a selected printing device, of the one or more available printing devices, the client, without the use of a printer driver, causing the electronic document to be printed by:
        sending the electronic document to the selected printing device; and
        sending print configuration data to the selected printing device, wherein the print configuration data is data that instructs the selected printing device how to print the electronic document using the printing features supported by the selected printing device.

2. The method of claim 1, wherein the client identifying the one or more available printing devices is performed in response to the client receiving a request, from a user, to print the electronic document.

3. The method of claim 1, wherein the print configuration data is expressed using a protocol that supports interoperable machine-to-machine interaction.

4. The method of claim 1, wherein a unicast message indicating that a particular printing device is available is received by the client in response to the client sending a broadcast message, over the network, that requests all available printing devices to identify themselves to the client.

5. The method of claim 1, wherein the client causing the electronic document to be printed further comprises:
    determining whether the printing features of the selected printing device support a current version of the electronic document, wherein the current version of the electronic documents corresponds to a format used to express the electronic document at the time the request to print the electronic document is received by the client;
    upon determining that the printing features of the selected printing device do not support the current version of the electronic document, the client creating an open standard version of the electronic document, wherein the open standard version of the electronic document describes the electronic document using a page description language (PDL),
    wherein the version of the electronic document sent to the selected printing device is the open standard version.

6. The method of claim 5, wherein identifying the one or more available printing devices comprises the client receiving a broadcast message from a particular available printing device of the one or more available printing devices, and wherein the particular available printing device sends the broadcast message in response to the particular available printing device joining the network.

7. The method of claim 1, further comprising:
    the client presenting an interface to a user to allow the user to view the printing features of the one or more available printing devices; and
    receiving, through the interface, user selection data that identifies (a) the selected printing device, and (b) how the selected printing device should print the electronic document using the printing features supported by the selected printing device.

8. A method for printing an electronic document, comprising:
    a client identifying one or more available printing devices by receiving a message, over a network, from each of the one or more available printing devices;
    the client communicating with the one or more available printing devices to identify printing features supported by the one or more available printing devices;
    in response to the client receiving a request to print an electronic document to a selected printing device, of the one or more available printing devices, the client, without the use of a printer driver, causing the electronic document to be printed by:
        sending document identification data to the selected printing device, wherein the document identification data identifies a location where the selected printing device may retrieve the electronic document; and
        sending print configuration data to the selected printing device, wherein the print configuration data is data that instructs the selected printing device how to print the electronic document using the printing features supported by the selected printing device.

9. The method of claim 8, wherein the client identifying the one or more available printing devices is performed in response to the client receiving a request, from a user, to print the electronic document.

10. The method of claim 8, wherein the print configuration data is expressed using a protocol that supports interoperable machine-to-machine interaction.

11. The method of claim 8, wherein a unicast message indicating that a particular printing device is available is received by the client in response to the client sending a broadcast message, over the network, that requests all available printing devices to identify themselves to the client.

12. The method of claim 8, further comprising:
    the client presenting an interface to a user to allow the user to view the printing features of the one or more available printing devices; and
    receiving, through the interface, user selection data that identifies (a) the selected printing device, and (b) how the selected printing device should print the electronic document using the printing features supported by the selected printing device.

13. A method for printing an electronic document, comprising:
    a printing device communicating with a client to provide to the client, data that indicates one or more printing features supported by the printing device;
    at the printing device, receiving, from the client, an electronic document described using a page description language (PDL);
    at the printing device, receiving, from the client, print configuration data that instructs the printing device how to print the electronic document using printing features supported by the printing device; and
    processing the electronic document and the print configuration data to cause the electronic document to be printed,
    wherein the electronic document and the print configuration data are received by the printing device from the client, without the use of a printer driver.

14. The method of claim 13, wherein processing the electronic document comprises:
    preparing the electronic document for printing by converting the electronic document from being described using the PDL to being described using a native format which a printing engine of the printing device can process, wherein the electronic document described using the native format does not include the print configuration data; and printing the electronic document using the native format.

15. The method of claim 13, wherein processing the electronic document comprises:

preparing the electronic document for printing by converting the electronic document from being described using the PDL to being described using a native format which a printing engine of the printing device can process, wherein the electronic document described using the native format includes the print configuration data; and printing the electronic document using the native format.

16. A machine-readable medium carrying one or more sequences of instructions for printing an electronic document, wherein execution of the one or more sequences of instructions by one or more processors causes:

a client identifying one or more available printing devices by receiving a message, over a network, from each of the one or more available printing devices;

the client communicating with the one or more available printing devices to identify printing features supported by the one or more available printing devices;

in response to the client receiving a request to print an electronic document to a selected printing device, of the one or more available printing devices, the client, without the use of a printer driver, causing the electronic document to be printed by:

sending the electronic document to the selected printing device; and sending print configuration data to the selected printing device, wherein the print configuration data is data that instructs the selected printing device how to print the electronic document using the printing features supported by the selected printing device.

17. The machine-readable medium of claim 16, wherein the client identifying the one or more available printing devices is performed in response to the client receiving a request, from a user, to print the electronic document.

18. The machine-readable medium of claim 16, wherein the print configuration data is expressed using a protocol that supports interoperable machine-to-machine interaction.

19. The machine-readable medium of claim 16, wherein a unicast message indicating that a particular printing device is available is received by the client in response to the client sending a broadcast message, over the network, that requests all available printing devices to identify themselves to the client.

20. The machine-readable medium of claim 16, wherein the client causing the electronic document to be printed further comprises:

determining whether the printing features of the selected printing device support a current version of the electronic document, wherein the current version of the electronic documents corresponds to a format used to express the electronic document at the time the request to print the electronic document is received by the client;

upon determining that the printing features of the selected printing device do not support the current version of the electronic document, the client creating an open standard version of the electronic document, wherein the open standard version of the electronic document describes the electronic document using a page description language (PDL), wherein the version of the electronic document sent to the selected printing device is the open standard version.

21. The machine-readable medium of claim 20, wherein identifying the one or more available printing devices comprises the client receiving a broadcast message from a particular available printing device of the one or more available printing devices, and wherein the particular available printing device sends the broadcast message in response to the particular available printing device joining the network.

22. The machine-readable medium of claim 16, wherein execution of the one or more sequences of instructions by the one or more processors further causes:

the client presenting an interface to a user to allow the user to view the printing features of the one or more available printing devices; and receiving, through the interface, user selection data that identifies (a) the selected printing device, and (b) how the selected printing device should print the electronic document using the printing features supported by the selected printing device.

23. A machine-readable medium carrying one or more sequences of instructions for printing an electronic document, wherein execution of the one or more sequences of instructions by one or more processors causes:

a client identifying one or more available printing devices by receiving a message, over a network, from each of the one or more available printing devices;

the client communicating with the one or more available printing devices to identify printing features supported by the one or more available printing devices;

in response to the client receiving a request to print an electronic document to a selected printing device, of the one or more available printing devices, the client, without the use of a printer driver, causing the electronic document to be printed by:

sending document identification data to the selected printing device, wherein the document identification data identifies a location where the selected printing device may retrieve the electronic document; and sending print configuration data to the selected printing device, wherein the print configuration data is data that instructs the selected printing device how to print the electronic document using the printing features supported by the selected printing device.

24. The machine-readable medium of claim 23, wherein the client identifying the one or more available printing devices is performed in response to the client receiving a request, from a user, to print the electronic document.

25. The machine-readable medium of claim 23, wherein the print configuration data is expressed using a protocol that supports interoperable machine-to-machine interaction.

26. The machine-readable medium of claim 23, wherein a unicast message indicating that a particular printing device is available is received by the client in response to the client sending a broadcast message, over the network, that requests all available printing devices to identify themselves to the client.

27. The machine-readable medium of claim 23, wherein execution of the one or more sequences of instructions by the one or more processors further causes:

the client presenting an interface to a user to allow the user to view the printing features of the one or more available printing devices; and receiving, through the interface, user selection data that identifies (a) the selected printing device, and (b) how the selected printing device should print the electronic document using the printing features supported by the selected printing device.

28. A machine-readable medium carrying one or more sequences of instructions for printing an electronic document, wherein execution of the one or more sequences of instructions by one or more processors causes:

a printing device communicating with a client to provide to the client, data that indicates one or more printing features supported by the printing device;

at the printing device, receiving, from the client, an electronic document described using a page description language (PDL);

at the printing device, receiving, from the client, print configuration data that instructs the printing device how to print the electronic document using printing features supported by the printing device; and processing the electronic document and the print configuration data to cause the electronic document to be printed, wherein the electronic document and the print configuration data are received by the printing device from the client, without the use of a printer driver.

29. The machine-readable medium of claim 28, wherein processing the electronic document comprises:

preparing the electronic document for printing by converting the electronic document from being described using the PDL to being described using a native format which a printing engine of the printing device can process, wherein the electronic document described using the native format does not include the print configuration data; and printing the electronic document using the native format.

30. The machine-readable medium of claim 28, wherein processing the electronic document comprises:

preparing the electronic document for printing by converting the electronic document from being described using the PDL to being described using a native format which a printing engine of the printing device can process, wherein the electronic document described using the native format includes the print configuration data; and printing the electronic document using the native format.

31. An apparatus for printing an electronic document, comprising:

one or more processors; and a machine-readable medium storing one or more sequences of instructions for printing an electronic document, wherein execution of the one or more sequences of instructions by the one or more processors causes:

a client identifying one or more available printing devices by receiving a message, over a network, from each of the one or more available printing devices;

the client communicating with the one or more available printing devices to identify printing features supported by the one or more available printing devices;

in response to the client receiving a request to print an electronic document to a selected printing device, of the one or more available printing devices, the client, without the use of a printer driver, causing the electronic document to be printed by:

sending the electronic document to the selected printing device; and sending print configuration data to the selected printing device, wherein the print configuration data is data that instructs the selected printing device how to print the electronic document using the printing features supported by the selected printing device.

32. The apparatus of claim 31, wherein the client identifying the one or more available printing devices is performed in response to the client receiving a request, from a user, to print the electronic document.

33. The apparatus of claim 31, wherein the print configuration data is expressed using a protocol that supports interoperable machine-to-machine interaction.

34. The apparatus of claim 31, wherein a unicast message indicating that a particular printing device is available is received by the client in response to the client sending a broadcast message, over the network, that requests all available printing devices to identify themselves to the client.

35. The apparatus of claim 31, wherein the client causing the electronic document to be printed further comprises:

determining whether the printing features of the selected printing device support a current version of the electronic document, wherein the current version of the electronic documents corresponds to a format used to express the electronic document at the time the request to print the electronic document is received by the client;

upon determining that the printing features of the selected printing device do not support the current version of the electronic document, the client creating an open standard version of the electronic document, wherein the open standard version of the electronic document describes the electronic document using a page description language (PDL), wherein the version of the electronic document sent to the selected printing device is the open standard version.

36. The apparatus of claim 35, wherein identifying the one or more available printing devices comprises the client receiving a broadcast message from a particular available printing device of the one or more available printing devices, and wherein the particular available printing device sends the broadcast message in response to the particular available printing device joining the network.

37. The apparatus of claim 31, wherein execution of the one or more sequences of instructions by the one or more processors further causes:

the client presenting an interface to a user to allow the user to view the printing features of the one or more available printing devices; and receiving, through the interface, user selection data that identifies (a) the selected printing device, and (b) how the selected printing device should print the electronic document using the printing features supported by the selected printing device.

38. An apparatus for printing an electronic document, comprising:

one or more processors; and a machine-readable medium storing one or more sequences of instructions for printing an electronic document, wherein execution of the one or more sequences of instructions by the one or more processors causes:

a client identifying one or more available printing devices by receiving a message, over a network, from each of the one or more available printing devices;

the client communicating with the one or more available printing devices to identify printing features supported by the one or more available printing devices;

in response to the client receiving a request to print an electronic document to a selected printing device, of the one or more available printing devices, the client, without the use of a printer driver, causing the electronic document to be printed by:

sending document identification data to the selected printing device, wherein the document identification data identifies a location where the selected printing device may retrieve the electronic document; and sending print configuration data to the selected printing device, wherein the print configuration data is data that instructs the selected printing device how to print the electronic document using the printing features supported by the selected printing device.

39. The apparatus of claim 38, wherein the client identifying the one or more available printing devices is performed in response to the client receiving a request, from a user, to print the electronic document.

40. The apparatus of claim 38, wherein the print configuration data is expressed using a protocol that supports interoperable machine-to-machine interaction.

41. The apparatus of claim 38, wherein a unicast message indicating that a particular printing device is available is received by the client in response to the client sending a broadcast message, over the network, that requests all available printing devices to identify themselves to the client.

42. The apparatus of claim 38, wherein execution of the one or more sequences of instructions by the one or more processors further causes:

the client presenting an interface to a user to allow the user to view the printing features of the one or more available printing devices; and receiving, through the interface, user selection data that identifies (a) the selected printing device, and (b) how the selected printing device should print the electronic document using the printing features supported by the selected printing device.

43. An apparatus for printing an electronic document, comprising:

one or more processors; and a machine-readable medium storing one or more sequences of instructions for printing an electronic document, wherein execution of the one or more sequences of instructions by the one or more processors causes:

a printing device communicating with a client to provide to the client, data that indicates one or more printing features supported by the printing device;

at the printing device, receiving, from the client, an electronic document described using a page description language (PDL);

at the printing device, receiving, from the client, print configuration data that instructs the printing device how to print the electronic document using printing features supported by the printing device; and processing the electronic document and the print configuration data to cause the electronic document to be printed, wherein the electronic document and the print configuration data are received by the printing device from the client, without the use of a printer driver.

44. The apparatus of claim 43, wherein processing the electronic document comprises:

preparing the electronic document for printing by converting the electronic document from being described using the PDL to being described using a native format which a printing engine of the printing device can process, wherein the electronic document described using the native format does not include the print configuration data; and printing the electronic document using the native format.

45. The apparatus of claim 43, wherein processing the electronic document comprises:

preparing the electronic document for printing by converting the electronic document from being described using the PDL to being described using a native format which a printing engine of the printing device can process, wherein the electronic document described using the native format includes the print configuration data; and printing the electronic document using the native format.

* * * * *